US011382073B2

(12) United States Patent
Ni et al.

(10) Patent No.: US 11,382,073 B2
(45) Date of Patent: Jul. 5, 2022

(54) METHOD OF TRANSMITTING CONTROL INFORMATION, METHOD OF RECEIVING CONTROL INFORMATION, BASE STATION AND TERMINAL

(71) Applicants: China Mobile Communication Co., Ltd Research Institute, Beijing (CN); China Mobile Communications Group Co., Ltd., Beijing (CN)

(72) Inventors: Jiqing Ni, Beijing (CN); Wei Zhou, Beijing (CN); Jun Zuo, Beijing (CN); Ailing Wang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 89 days.

(21) Appl. No.: 16/649,130

(22) PCT Filed: Sep. 19, 2018

(86) PCT No.: PCT/CN2018/106501
§ 371 (c)(1),
(2) Date: Mar. 19, 2020

(87) PCT Pub. No.: WO2019/057083
PCT Pub. Date: Mar. 28, 2019

(65) Prior Publication Data

US 2020/0252924 A1 Aug. 6, 2020

(30) Foreign Application Priority Data

Sep. 20, 2017 (CN) ......................... 201710850321.4

(51) Int. Cl.
*H04W 72/04* (2009.01)
*H04L 1/00* (2006.01)

(52) U.S. Cl.
CPC ....... *H04W 72/0406* (2013.01); *H04L 1/0003* (2013.01)

(58) Field of Classification Search
CPC ........... H04W 72/0406; H04W 72/042; H04W 28/18; H04L 1/0003; H04L 1/003; H04L 5/00; H04L 1/0023
See application file for complete search history.

(56) References Cited

U.S. PATENT DOCUMENTS

2011/0317643 A1* 12/2011 Gaal ..................... H04L 5/0053 370/329
2012/0051453 A1* 3/2012 Luo ..................... H04B 7/0456 375/295

(Continued)

FOREIGN PATENT DOCUMENTS

CN 101646224 A 2/2010
CN 103125089 A 5/2013

(Continued)

OTHER PUBLICATIONS

Chinese Written Opinion of the International Searching Authority dated Nov. 30, 2018 for PCT/CN2018/106501, 9 pages.

(Continued)

*Primary Examiner* — Hassan Kizou
*Assistant Examiner* — Abdullahi Ahmed
(74) *Attorney, Agent, or Firm* — Morgan, Lewis & Bockius LLP

(57) ABSTRACT

A method of transmitting control information, a method of receiving control information, a base station and a terminal are provided. The method of transmitting control information includes: identifying the control information, wherein the control information at least comprises a first feature field and a second feature field, and a bit value of the first feature field is used to indicate a function and a length of the second feature field; sending the control information to a terminal device.

15 Claims, 3 Drawing Sheets

(56) References Cited

U.S. PATENT DOCUMENTS

| | | | | |
|---|---|---|---|---|
| 2013/0064204 | A1* | 3/2013 | Sun | H04L 1/0025 370/329 |
| 2016/0056933 | A1* | 2/2016 | Aiba | H04W 72/0406 370/329 |
| 2016/0057743 | A1* | 2/2016 | Aiba | H04W 72/0406 370/329 |
| 2017/0019915 | A1 | 1/2017 | Nogami et al. | |
| 2018/0338301 | A1 | 11/2018 | Gao et al. | |
| 2018/0376496 | A1* | 12/2018 | Wang | H04W 72/1289 |
| 2019/0207667 | A1* | 7/2019 | Zhou | H04L 1/0057 |
| 2019/0306861 | A1* | 10/2019 | Li | H04W 28/20 |
| 2021/0068095 | A1* | 3/2021 | Gordaychik | H04L 1/1896 |

FOREIGN PATENT DOCUMENTS

| | | | |
|---|---|---|---|
| CN | 106714320 | A | 5/2017 |
| CN | 106912094 | A | 6/2017 |
| CN | 107027184 | A | 8/2017 |

OTHER PUBLICATIONS

International Preliminary Report on Patentability with Written Opinion (in English) dated Nov. 30, 2018 for PCT/CN2018/106501, 6 pages.

* cited by examiner

| | RI=3 | MCS0 | |
|---|---|---|---|
| | first feature field | second feature field | |

| | RI=5 | MCS0 | MCS1 | |
|---|---|---|---|---|
| | first feature field | second feature field | | |

receiving control information, where the control information at least includes a first feature field and a second feature field, and a bit value of the first feature field is used to identify a function and a length of the second feature field  — 41

METHOD OF TRANSMITTING CONTROL INFORMATION, METHOD OF RECEIVING CONTROL INFORMATION, BASE STATION AND TERMINAL

CROSS REFERENCE OF RELATED APPLICATION

The present disclosure is the U.S. national phase of PCT Application PCT/CN2018/106501 filed on Sep. 19, 2018, which claims a priority of Chinese patent application No. 201710850321.4 filed on Sep. 20, 2017, which is incorporated herein by reference in its entirety.

TECHNICAL FIELD

The present disclosure relates to the field of communication technologies, and in particular to a method of transmitting control information, a method of receiving control information, a base station and a terminal.

BACKGROUND

In the long-term evolution (LTE) system, Downlink Control Information (DCI) sent by a base station to a user may be used to schedule a downlink data transmission, an uplink data transmission and a random access resource configuration of the user. The downlink control information includes a plurality of DCI formats, specifically: Format0/1/1A/1B/1C/1D/2/2A/2B/2C/2D/3/3A/4 and so on. Specifically, the DCI formats corresponds to different transmission modes and resource mapping modes, and a function of a bit field at a fixed position is also configured in advance, as shown in Table 1.

TABLE 1

Summary of DCI formats in LTE systems

| DCI format | length ( bit) | DCI purpose |
|---|---|---|
| Format 0 | 31 | Physical Uplink Shared Channel (PUSCH) scheduling |
| Format 1 | 42 | single code word Physical Downlink Shared Channel (PDSCH) scheduling |
| Format 1A | 31 | compact mode PDSCH scheduling |
| Format 1B | 33 | compact mode single code word PDSCH with precoding information indication |
| Format 1C | 15 | PDSCH scheduling in more compact mode |
| Format 1D | 33 | PDSCH scheduling (power offset) in multi-user multiple-input multiple-output mode |
| Format 2 | 54 | dual code word PDSCH scheduling in closed-loop spatial multiplexing mode |
| Format 2A | 51 | dual code word PDSCH scheduling in open-loop spatial multiplexing mode |
| Format 3 | 31 | multi-user power control command indication (2 bits per user) |
| Format 3A | 31 | multi-user power control command indication (1 bits per user) |
| Format 4 | | |

In addition, the length of each DCI format is fixed, but the length of the DCI may be adjusted within a certain range according to the specific configuration of the system functional field. For example, depending on whether a carrier aggregation is supported, there will be 0 or 3 bits to indicate the specific carrier index.

With the enhancement of the LTE version, the DCI format design method has gradually revealed its shortcomings. Every new added transmission mode requires a new DCI format design. The more transmission modes result in more types of DCI formats. Currently, there are more than 10 DCI formats in LTE systems, which will undoubtedly increase the complexity of system design. In addition, when transmitting DCI, the base station will first notify the user of the specific transmission mode through a radio resource control (RRC) signaling. Then, the base station uses the DCI format corresponding to the transmission mode to perform a resource scheduling and data transmission for the user. However, this design method cannot effectively support a dynamic transmission mode configuration.

SUMMARY

A method of transmitting control information, a method of receiving control information, a base station and a terminal are provided in the present disclosure, so as to solve the technical issue that the DCI format in the related art cannot support a dynamic configuration of transmission mode.

A method of transmitting control information is provided in an embodiment of the present disclosure, including:

identifying the control information, where the control information at least includes a first feature field and a second feature field, and a bit value of the first feature field is used to identify a function and a length of the second feature field;

sending the control information to a terminal device.

Optionally, the first feature field and the second feature field are feature fields with continuous bits or discontinuous bits in the control information, and the first feature field is prior to the second feature field.

Optionally, in the case that a bit value of the first feature field is smaller than or equal to a pre-defined value, the length of the second feature field is a first length, and the function of the second feature field is a first function;

in the case that the bit value of the first feature field is greater than the pre-defined value, the function of the second feature field is a second function, or the function of the second feature field includes the first function and the second function, and the length of the second feature field is a second length.

Optionally, in the case that a function of the first feature field is a rank indication, the function of the second feature field is a Modulation and Coding Scheme (MCS) indication.

Optionally, in the case that the rank indication of the first feature field is smaller than or equal to a pre-defined threshold, the second feature field is an MCS field, and a length of the MCS field is m bits;

in the case that the rank indication of the first feature field is greater than the pre-defined threshold, the second feature field includes two MCS fields, a length of each MCS field is m bits, and the length of the second feature field is 2m bits, where m is a positive integer.

Optionally, a function of the first feature field is a resource allocation mode indication, and the function of the second feature field is a resource allocation.

Optionally, a bit number of the first feature field is 1;

in the case that the first feature field is 0, a resource allocation mode of the second feature field is a bitmap resource allocation mode;

in the case that the first feature field is 1, the resource allocation mode of the second feature field is a continuous resource allocation mode.

A method of receiving control information is further provided in an embodiment of the present disclosure, including:

receiving control information, where the control information at least includes a first feature field and a second feature field, and a bit value of the first feature field is used to identify a function and a length of the second feature field.

Optionally, the first feature field and the second feature field are feature fields with continuous bits or discontinuous bits in the control information, and the first feature field is prior to the second feature field.

Optionally, the method further includes:

decoding the first feature field to determine a bit value of the first feature field;

identifying the function and the length of the second feature field according to the bit value of the first feature field; and decoding the second feature field according to the function and length of the second feature field.

Optionally, the identifying the function and the length of the second feature field according to the bit value of the first feature field includes:

in the case that a bit value of the first feature field is smaller than or equal to a pre-defined value, identifying that the length of the second feature field is a first length, and the function of the second feature field is a first function;

in the case that the bit value of the first feature field is greater than the pre-defined value, identifying that the function of the second feature field is a second function, or the function of the second feature field includes the first function and the second function, and the length of the second feature field is a second length.

Optionally, in the case that a function of the first feature field is a rank indication, the function of the second feature field is a Modulation and Coding Scheme (MCS) indication.

Optionally, in the case that the rank indication of the first feature field is smaller than or equal to a pre-defined threshold, the second feature field is an MCS field, and a length of the MCS field is m bits;

in the case that the rank indication of the first feature field is greater than the pre-defined threshold, the second feature field includes two MCS fields, a length of each MCS field is m bits, and the length of the second feature field is 2m bits, where m is a positive integer.

Optionally, a function of the first feature field is a resource allocation mode indication, and the function of the second feature field is a resource allocation.

Optionally, a bit number of the first feature field is 1;

in the case that the first feature field is 0, a resource allocation mode of the second feature field is a bitmap resource allocation mode;

in the case that the first feature field is 1, the resource allocation mode of the second feature field is a continuous resource allocation mode.

Abase station is further provided in an embodiment of the present disclosure, including a processor and a transceiver, where the processor is used to perform:

identifying the control information, where the control information at least includes a first feature field and a second feature field, and a bit value of the first feature field is used to identify a function and a length of the second feature field;

the transceiver is used to send the control information to a terminal device.

Optionally, the first feature field and the second feature field are feature fields with continuous bits or discontinuous bits in the control information, and the first feature field is prior to the second feature field.

Optionally, in the case that a bit value of the first feature field is smaller than or equal to a pre-defined value, the length of the second feature field is a first length, and the function of the second feature field is a first function;

in the case that the bit value of the first feature field is greater than the pre-defined value, the function of the second feature field is a second function, or the function of the second feature field includes the first function and the second function, and the length of the second feature field is a second length.

Optionally, in the case that a function of the first feature field is a rank indication, the function of the second feature field is a Modulation and Coding Scheme (MCS) indication.

Optionally, in the case that the rank indication of the first feature field is smaller than or equal to a pre-defined threshold, the second feature field is an MCS field, and a length of the MCS field is m bits;

in the case that the rank indication of the first feature field is greater than the pre-defined threshold, the second feature field includes two MCS fields, a length of each MCS field is m bits, and the length of the second feature field is 2m bits, where m is a positive integer.

Optionally, a function of the first feature field is a resource allocation mode indication, and the function of the second feature field is a resource allocation.

Optionally, a bit number of the first feature field is 1;

in the case that the first feature field is 0, a resource allocation mode of the second feature field is a bitmap resource allocation mode;

in the case that the first feature field is 1, the resource allocation mode of the second feature field is a continuous resource allocation mode.

A base station is further provided in an embodiment of the present disclosure, including a memory, a processor and a computer program stored in the memory and operable on the processor, where the processor is used to execute the computer program to perform the method of transmitting control information hereinabove.

A terminal is further provided in an embodiment of the present disclosure, including a processor and a transceiver, where the transceiver is used to receive control information, where the control information at least includes a first feature field and a second feature field, and a bit value of the first feature field is used to identify a function and a length of the second feature field.

Optionally, the first feature field and the second feature field are feature fields with continuous bits or discontinuous bits in the control information, and the first feature field is prior to the second feature field.

Optionally, the processor is used to perform:

decoding the first feature field to determine a bit value of the first feature field;

identifying the function and the length of the second feature field according to the bit value of the first feature field; and decoding the second feature field according to the function and length of the second feature field.

Optionally, the processor is further used to perform:

in the case that a bit value of the first feature field is smaller than or equal to a pre-defined value, identifying that the length of the second feature field is a first length, and the function of the second feature field is a first function;

in the case that the bit value of the first feature field is greater than the pre-defined value, identifying that the function of the second feature field is a second function, or the function of the second feature field includes the first function and the second function, and the length of the second feature field is a second length.

Optionally, in the case that a function of the first feature field is a rank indication, the function of the second feature field is a Modulation and Coding Scheme (MCS) indication.

Optionally, in the case that the rank indication of the first feature field is smaller than or equal to a pre-defined threshold, the second feature field is an MCS field, and a length of the MCS field is m bits;

in the case that the rank indication of the first feature field is greater than the pre-defined threshold, the second feature field includes two MCS fields, a length of each MCS field is m bits, and the length of the second feature field is 2m bits, where m is a positive integer.

Optionally, a function of the first feature field is a resource allocation mode indication, and the function of the second feature field is a resource allocation.

Optionally, a bit number of the first feature field is 1;

in the case that the first feature field is 0, a resource allocation mode of the second feature field is a bitmap resource allocation mode;

in the case that the first feature field is 1, the resource allocation mode of the second feature field is a continuous resource allocation mode.

A terminal is further provided in an embodiment of the present disclosure, including a memory, a processor and a computer program stored in the memory and operable on the processor, where the processor is used to execute the computer program to perform the method of receiving control information hereinabove.

A computer-readable storage medium storing a computer program is further provided in an embodiment of the present disclosure, where the program is executed by a processor to perform the method of transmitting control information hereinabove, or the program is executed by a processor to perform the method of receiving control information hereinabove.

According to the embodiments of the present disclosure, the function and the length of the second feature field are indicated dynamically through the bit value of the first feature field of the control information, so that the control information may support effectively the dynamic configuration of multiple transmission modes and transmission parameters.

DETAILED DESCRIPTION

In order to make the technical issues, technical solutions and advantages of the present disclosure clearer, the present disclosure will be described in detail with reference to the drawings and embodiments.

Figure 1:
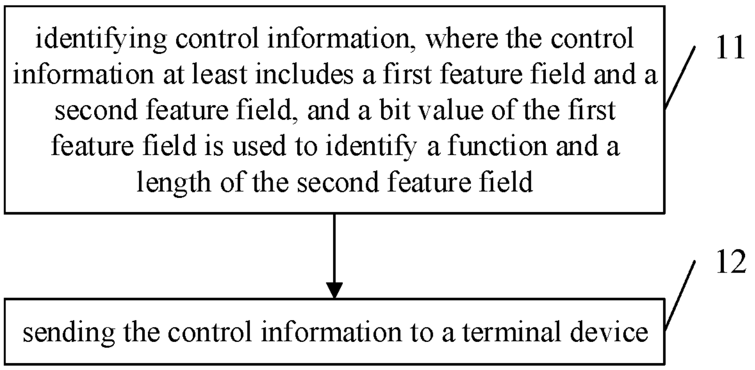
FIG. 1 is a flowchart of a method of transmitting control information in an embodiment of the present disclosure.

As shown in FIG. 1, a method of transmitting control information is provided in an embodiment of the present disclosures, including:

Step 11: identifying the control information, where the control information at least includes a first feature field and a second feature field, and a bit value of the first feature field is used to identify a function and a length of the second feature field;

Step 12: sending the control information to a terminal device.

According to the embodiments of the present disclosure, the format of the control information is modified, the function and the length of the second feature field is identified dynamically through the bit value of the first feature field, so that the dynamic indication may be achieved. Specifically, the different functions and the lengths of the second feature field are identified dynamically through different bit values of the first feature field.

Optionally, the above control information may be uplink control information, downlink control information, or other control information, which is not specifically limited herein. It should be noted that the bit value of the first feature field may be specifically used to identify the function and length of the control field included in the second feature field.

It should be noted that the above-mentioned first feature field may also be called a first bit field, and the second feature field may also be called a second bit field; that is, the feature field may also be called a bit field.

Further, in the above embodiment of the present disclosure, the first feature field and the second feature field are feature fields with continuous bits in the control information, and the first feature field is prior to the second feature field.

Alternatively, the first feature field and the second feature field are feature fields with discontinuous bits in the control information, and the first feature field is prior to the second feature field.

Further, in the foregoing embodiment of the present disclosure, in the case that a bit value of the first feature field is smaller than or equal to a pre-defined value, the length of the second feature field is a first length, and the function of the second feature field is a first function;

in the case that the bit value of the first feature field is greater than the pre-defined value, the function of the second feature field is a second function, or the function of the second feature field includes the first function and the second function, and the length of the second feature field is a second length.

Figure 2:
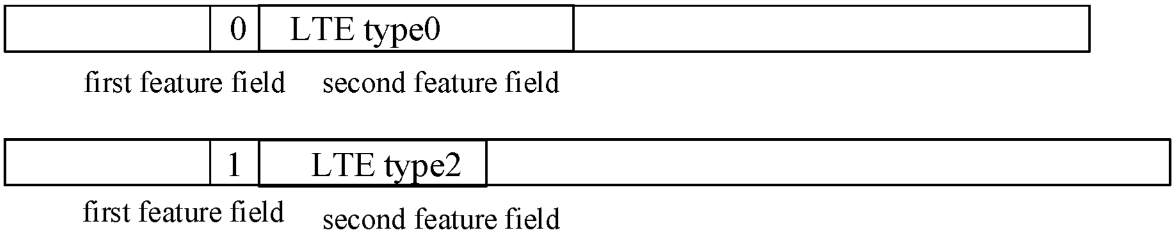
FIG. 2 shows a format of control information in an embodiment of the present disclosure.

For example, the first feature field is a resource allocation mode indication. As shown in FIG. 2, when the bit value of the first feature field is 0, the type of the resource allocation mode indicated by the second feature field type is LTE type 0 (bitmap resource allocation mode); when the bit value of the first feature field is 1, the type of the LTE resource allocation mode indicated by the second feature field type is LTE type 2 (continuous resource allocation mode).

Further, in some embodiments of the present disclosure, in the case that a function of the first feature field is a rank indication, the function of the second feature field is a Modulation and Coding Scheme (MCS) indication.

Correspondingly, in the case that the rank indication of the first feature field is smaller than or equal to a pre-defined threshold, the second feature field is an MCS field, and a length of the MCS field is m bits; in the case that the rank indication of the first feature field is greater than the pre-defined threshold, the second feature field includes two MCS fields, a length of each MCS field is m bits, and the length of the second feature field is 2m bits, where m is a positive integer.

Optionally, the length of the first feature field is 3 bits, the pre-defined threshold value is 4, and m is equal to 5.

Figure 3:
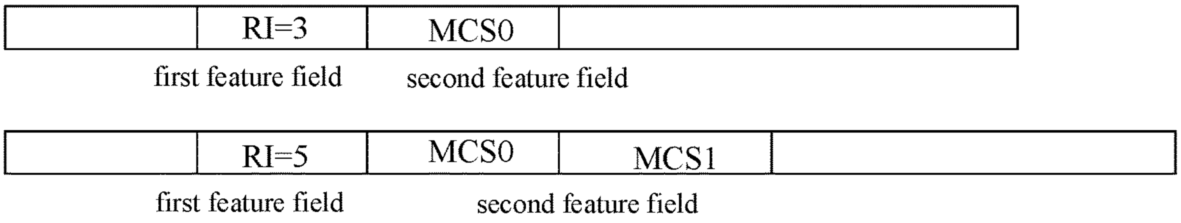
FIG. 3 a format of another control information in an embodiment of the present disclosure.

For example, as shown in FIG. 3, when the rank indication of the first feature field RI=3, the control field of the second feature field includes an MCS field (i.e., MCS0), the length of the feature field is 5 bits. When the rank indication of the first feature field RI=5 (that is, RI is greater than 4), the control field of the second feature field includes two MCS fields (MCS0 and MCS1), and the length of the second feature field is 10 bits.

It should be noted that other feature fields of the control information may also be associated with the first feature field and/or the second feature field. For example, the bit value of the second feature field is used to identify the functions and lengths of the other feature fields, or the bit value of the first feature field is used to identify the functions and lengths of the other feature fields (i.e., the bit value of the first feature field identifies the functions and lengths of multiple feature fields including the second feature field and other feature fields).

According to method of transmitting control information in the embodiments of the present disclosure, the function and the length of the second feature field are identified dynamically through the bit value of the first feature field of the control information, so that the control information may support effectively the dynamic configuration of multiple transmission modes and transmission parameters.

Figure 4:
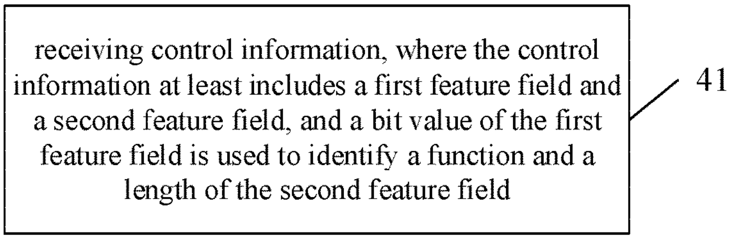
FIG. 4 is a flowchart of a method of receiving control information in an embodiment of the present disclosure.

As shown in FIG. 4, a method of receiving control information is further provided in an embodiment of the present disclosure, including:

Step 41: receiving control information, where the control information at least includes a first feature field and a second feature field, and a bit value of the first feature field is used to identify a function and a length of the second feature field.

According to the embodiments of the present disclosure, the format of the control information DCI is modified, the function and the length of the second feature field is identified dynamically through the bit value of the first feature field, so that the dynamic indication may be achieved. Specifically, the different functions and the lengths of the second feature field are identified dynamically through different bit values of the first feature field.

It should be noted that the above-mentioned first feature field may also be referred to as a first bit field, and the second feature field may also be referred to as a second bit field; that is, the feature field may also be referred to as a bit field.

Further, in the above embodiment of the present disclosure, the first feature field and the second feature field are feature fields with continuous bits in the control information, and the first feature field is prior to the second feature field.

Alternatively, the first feature field and the second feature field are feature fields with discontinuous bits in the control information, and the first feature field is prior to the second feature field.

Further, in the above embodiments of the present disclosure, the method further includes:

decoding the first feature field to determine a bit value of the first feature field;

identifying the function and the length of the second feature field according to the bit value of the first feature field; and decoding the second feature field according to the function and length of the second feature field.

In the foregoing embodiment of the present disclosure, the terminal uses the Polar code to sequentially decode the received control information, and identifies the function and length of the second decoded feature field to be subsequently decoded according to the bit value of the decoded first feature field, so as to decode the second feature field. The terminal does not need to determine firstly the specific transmission mode according to the RRC signaling, nor further determine the DCI format according to the transmission mode. The terminal may directly decode the first feature field to dynamically determine the function and length of the second feature field, thereby configuring dynamically multiple transmission modes and transmission parameters.

Optionally, in some embodiments of the present disclosure, the identifying the function and the length of the second feature field according to the bit value of the first feature field includes:

in the case that a bit value of the first feature field is smaller than or equal to a pre-defined value, identifying that the length of the second feature field is a first length, and the function of the second feature field is a first function;

in the case that the bit value of the first feature field is greater than the pre-defined value, identifying that the function of the second feature field is a second function, or the function of the second feature field includes the first function and the second function, and the length of the second feature field is a second length.

For example, the first feature field is a resource allocation mode indication. As shown in FIG. 2, when the bit value of the first feature field is 0, the type of the resource allocation mode indicated by the second feature field type is LTE type 0 (bitmap resource allocation mode); when the bit value of the first feature field is 1, the type of the LTE resource allocation mode indicated by the second feature field type is LTE type 2 (continuous resource allocation mode).

Further, in some embodiments of the present disclosure, in the case that a function of the first feature field is a rank indication, the function of the second feature field is a Modulation and Coding Scheme (MCS) indication.

Correspondingly, in the case that the rank indication of the first feature field is smaller than or equal to a pre-defined threshold, the second feature field is an MCS field, and a length of the MCS field is m bits; in the case that the rank indication of the first feature field is greater than the pre-defined threshold, the second feature field includes two MCS fields, a length of each MCS field is m bits, and the length of the second feature field is 2m bits, where m is a positive integer.

Optionally, the length of the first feature field is 3 bits, the pre-defined threshold value is 4, and m is equal to 5.

For example, as shown in FIG. 3, when the rank indication of the first feature field RI=3, the control field of the second feature field includes an MCS field (i.e., MCS0), the length of the feature field is 5 bits. When the rank indication of the first feature field RI=5 (that is, RI is greater than 4), the control field of the second feature field includes two MCS fields (MCS0 and MCS1), and the length of the second feature field is 10 bits.

It should be noted that other feature fields of the control information may also be associated with the first feature field and/or the second feature field. For example, the bit value of the second feature field is used to identify the functions and lengths of the other feature fields, or the bit value of the first feature field is used to identify the functions and lengths of the other feature fields (i.e., the bit value of the first feature field identifies the functions and lengths of multiple feature fields including the second feature field and other feature fields).

According to method of receiving control information in the embodiments of the present disclosure, the function and the length of the second feature field are identified dynamically through the bit value of the first feature field of the control information, so that the control information may support effectively the dynamic configuration of multiple transmission modes and transmission parameters.

Figure 5:
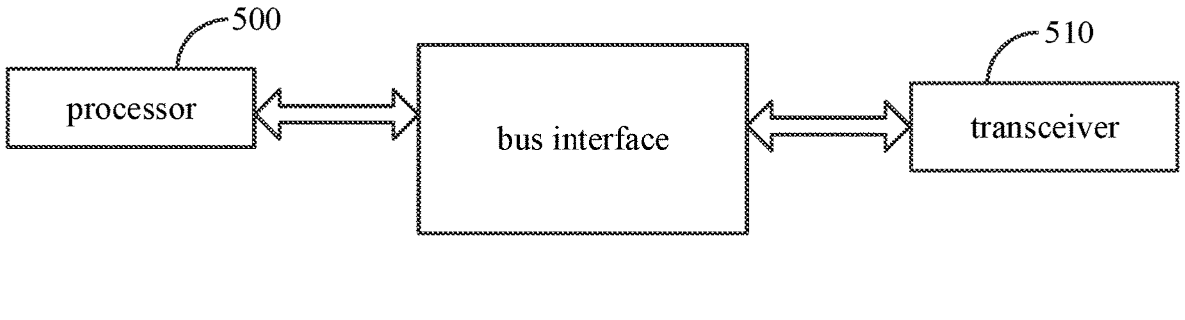
FIG. 5 is a schematic view of a base station in an embodiment of the present disclosure.

As shown in FIG. 5, a base station is further provided in an embodiment of the present disclosure, including a processor 500 and a transceiver 510. where the processor 500 is used to perform:

identifying the control information, where the control information at least includes a first feature field and a second feature field, and a bit value of the first feature field is used to identify a function and a length of the second feature field;

the transceiver 510 is used to send the control information to a terminal device.

Optionally, in some embodiments of the present disclosure, the first feature field and the second feature field are feature fields with continuous bits in the control information, and the first feature field is prior to the second feature field.

Optionally, in some embodiments of the present disclosure, the first feature field and the second feature field are feature fields with discontinuous bits in the control information, and the first feature field is prior to the second feature field.

Optionally, in some embodiments of the present disclosure, in the case that a bit value of the first feature field is smaller than or equal to a pre-defined value, the length of the second feature field is a first length, and the function of the second feature field is a first function;

in the case that the bit value of the first feature field is greater than the pre-defined value, the function of the second feature field is a second function, or the function of the second feature field includes the first function and the second function, and the length of the second feature field is a second length.

Optionally, in the case that a function of the first feature field is a rank indication, the function of the second feature field is a Modulation and Coding Scheme (MCS) indication.

Optionally, in the case that the rank indication of the first feature field is smaller than or equal to a pre-defined threshold, the second feature field is an MCS field, and a length of the MCS field is m bits; in the case that the rank indication of the first feature field is greater than the pre-defined threshold, the second feature field includes two MCS fields, a length of each MCS field is m bits, and the length of the second feature field is 2m bits, where m is a positive integer.

Optionally, in some embodiments of the present disclosure, the length of the first feature field is 3 bits, the pre-defined threshold value is 4, and m is equal to 5.

According to base station in the embodiments of the present disclosure, the function and the length of the second feature field are identified dynamically through the bit value of the first feature field of the control information, so that the control information may support effectively the dynamic configuration of multiple transmission modes and transmission parameters.

It should be noted that the base station in the embodiments of the present disclosure is a base station capable of performing the above-mentioned method of transmitting the control information, and all the embodiments of the above-mentioned method of transmitting the control information are applicable to the base station, and may achieve the same or similar benefits effect.

A base station is further provided in an embodiment of the present disclosure, including a memory, a processor and a computer program stored in the memory and operable on the processor, where the processor is used to execute the computer program to perform the method of transmitting control information hereinabove, and can achieve the same technical effect. To avoid repetition, details thereof are omitted herein.

A computer-readable storage medium storing a computer program is further provided in an embodiment of the present disclosure, the program is executed by a processor to perform the method of transmitting control information hereinabove, and can achieve the same technical effects. To avoid repetition, details thereof are omitted herein. The computer-readable storage medium is, for example, a read-only memory (ROM), a random access memory (RAM), a magnetic disk or an optical disk.

Figure 6:
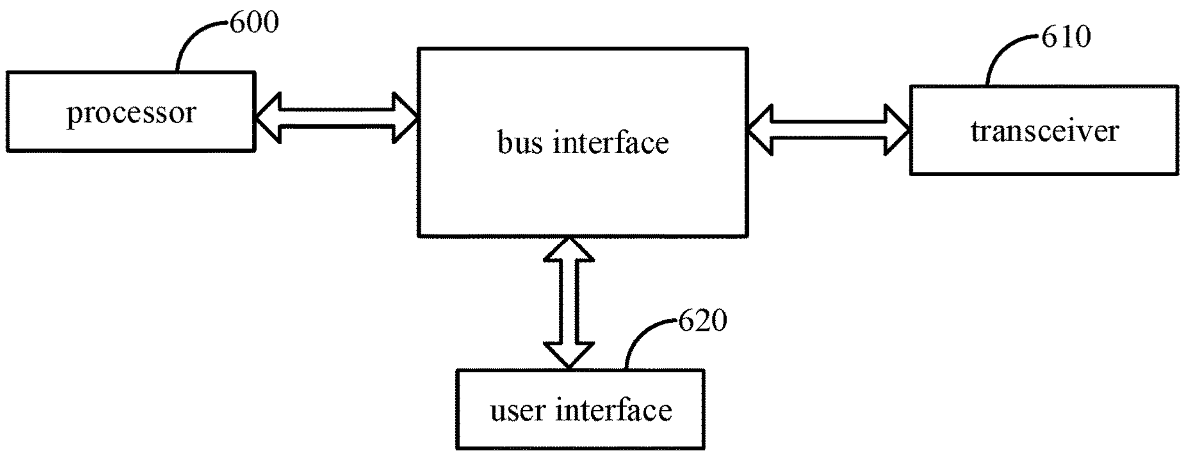
FIG. 6 is a schematic view of a terminal in an embodiment of the present disclosure.

As shown in FIG. 6, a terminal is further provided in an embodiment of the present disclosure, including a processor 600 and a transceiver 610. The terminal further includes a user interface 620, and the transceiver 610 is used to receive control information. The control information at least includes a first feature field and a second feature field, and a bit value of the first feature field is used to identify a function and a length of the second feature field.

Optionally, in some embodiments of the present disclosure, the first feature field and the second feature field are feature fields with continuous bits in the control information, and the first feature field is prior to the second feature field.

Optionally, in some embodiments of the present disclosure, the first feature field and the second feature field are feature fields with discontinuous bits in the control information, and the first feature field is prior to the second feature field.

Optionally, in some embodiments of the present disclosure, the processor 600 is further used to perform:

decoding the first feature field to determine a bit value of the first feature field;

identifying the function and the length of the second feature field according to the bit value of the first feature field; and decoding the second feature field according to the function and length of the second feature field.

Optionally, in some embodiments of the present disclosure, the processor 600 is further used to perform:

in the case that a bit value of the first feature field is smaller than or equal to a pre-defined value, identifying that the length of the second feature field is a first length, and the function of the second feature field is a first function;

in the case that the bit value of the first feature field is greater than the pre-defined value, identifying that the function of the second feature field is a second function, or the function of the second feature field includes the first function and the second function, and the length of the second feature field is a second length.

Optionally, in some embodiments of the present disclosure, in the case that a function of the first feature field is a rank indication, the function of the second feature field is a Modulation and Coding Scheme (MCS) indication.

Optionally, in some embodiments of the present disclosure, in the case that the rank indication of the first feature field is smaller than or equal to a pre-defined threshold, the second feature field is an MCS field, and a length of the MCS field is m bits; in the case that the rank indication of the first feature field is greater than the pre-defined threshold, the second feature field includes two MCS fields, a length of each MCS field is m bits, and the length of the second feature field is 2m bits, where m is a positive integer.

Optionally, in some embodiments of the present disclosure, in the embodiment of the present disclosure, the length of the first feature field is 3 bits, the pre-defined threshold value is 4, and m is equal to 5.

According to terminal in the embodiments of the present disclosure, the function and the length of the second feature field are identified dynamically through the bit value of the first feature field of the control information, so that the control information may support effectively the dynamic configuration of multiple transmission modes and transmission parameters.

It should be noted that the terminal in the embodiments of the present disclosure is a terminal capable of performing the above-mentioned method of receiving the control information, and all the embodiments of the above-mentioned method of receiving the control information are applicable to the terminal, and may achieve the same or similar benefits effect.

A terminal is further provided in an embodiment of the present disclosure, including a memory, a processor and a computer program stored in the memory and operable on the processor, where the processor is used to execute the computer program to perform the method of receiving control information hereinabove, and can achieve the same technical effect. To avoid repetition, details thereof are omitted herein.

A computer-readable storage medium storing a computer program is further provided in an embodiment of the present disclosure, the program is executed by a processor to perform the method of receiving control information hereinabove, and can achieve the same technical effects. To avoid repetition, details thereof are omitted herein. The computer-readable storage medium is, for example, a read-only memory (ROM), a random access memory (RAM), a magnetic disk or an optical disk.

Those skilled in the art should understand that the embodiments of the present disclosure may be provided as a method, a system, or a computer program product. Therefore, this application may take the form of an entirely hardware embodiment, an entirely software embodiment, or an embodiment combining software and hardware aspects. Moreover, the present disclosure may take the form of a computer program product implemented on one or more computer-readable storage media (including, but not limited to, magnetic disk storage, optical storage, and the like) containing computer-usable program code.

The present disclosure is described with reference to the flowcharts and/or block diagrams of the methods, devices (systems) and computer program products according to the embodiments of the present disclosure. It should be understood that each process and/or block in the flowcharts and/or block diagrams, and combinations of processes and/or blocks in the flowcharts and/or block diagrams can be implemented by computer program instructions. These computer program instructions may be provided to a processor of a general-purpose computer, special-purpose computer, embedded processor, or other programmable data processing device to produce a machine, so that instructions generated by the processor of the computer or other programmable data processing device may be used to generate instructions. Means for implementing the functions specified in one or more processes and/or one or more blocks of the flowchart.

These computer program instructions may also be stored in a computer-readable storage medium capable of directing a computer or other programmable data processing device to work in a particular manner such that the instructions stored in the computer-readable storage medium produce a paper product including the instruction means, The instruction device implements the functions specified in one or more flowcharts and/or one or more blocks of the block diagram.

These computer program instructions can also be loaded onto a computer or other programmable data processing device, causing the computer or other programmable device to perform a series of operational steps to produce a computer-implemented process, and thus the instructions executed on the computer or other programming device Provides steps for implementing the functions specified in one or more flowcharts and/or one or more blocks of the block diagrams.

The above are some embodiments of the present disclosure. It should be noted that for those of ordinary skill in the art, without departing from the principle described in the present disclosure, improvements and modifications may be made. These improvements and modifications should also be regarded as the scope of the present disclosure.

What is claimed is:

1. A method of transmitting control information, comprising:

identifying the control information, wherein the control information at least comprises a first feature field and a second feature field, and a bit value of the first feature field is used to identify a function and a length of the second feature field;

sending the control information to a terminal device;

wherein a function of the first feature field is a resource allocation mode indication, and the function of the second feature field is a resource allocation.

2. The method according to claim 1, wherein the first feature field and the second feature field are feature fields with continuous bits or discontinuous bits in the control information, and the first feature field is prior to the second feature field.

3. The method according to claim 1, wherein in the case that the bit value of the first feature field is smaller than or equal to a pre-defined value, the function of the second feature field is a first function, and the length of the second feature field is a first length;

in the case that the bit value of the first feature field is greater than the pre-defined value, the function of the second feature field is a second function, or the function of the second feature field comprises the first function and the second function, and the length of the second feature field is a second length.

4. The method according to claim 1, wherein in the case that a function of the first feature field is a rank indication, the function of the second feature field is a Modulation and Coding Scheme (MCS) indication.

5. The method according to claim 4, wherein in the case that the rank indication of the first feature field is smaller than or equal to a pre-defined threshold, the second feature field is an MCS field, and a length of the MCS field is m bits;

in the case that the rank indication of the first feature field is greater than the pre-defined threshold, the second feature field comprises two MCS fields, a length of each MCS field is m bits, and the length of the second feature field is 2m bits, wherein m is a positive integer.

6. The method according to claim 1, wherein a bit number of the first feature field is 1;

in the case that the first feature field is 0, the function of the second feature field is a bitmap resource allocation mode;

in the case that the first feature field is 1, the function of the second feature field is a continuous resource allocation mode.

7. A method of receiving control information, comprising:

receiving control information, wherein the control information at least comprises a first feature field and a second feature field, and a bit value of the first feature field is used to identify a function and a length of the second feature field;

wherein a function of the first feature field is a resource allocation mode indication, and the function of the second feature field is a resource allocation.

8. The method according to claim 7, wherein the first feature field and the second feature field are feature fields with continuous bits or discontinuous bits in the control information, and the first feature field is prior to the second feature field.

9. The method according to claim 7, further comprising:

decoding the first feature field to determine the bit value of the first feature field;

identifying the function and the length of the second feature field according to the bit value of the first feature field; and decoding the second feature field according to the identified function and length of the second feature field.

10. The method according to claim 9, wherein the identifying the function and the length of the second feature field according to the bit value of the first feature field comprises:

in the case that the bit value of the first feature field is smaller than or equal to a pre-defined value, identifying that the function of the second feature field is a first function, and the length of the second feature field is a first length;

in the case that the bit value of the first feature field is greater than the pre-defined value, identifying that the function of the second feature field is a second function, or the function of the second feature field comprises the first function and the second function, and the length of the second feature field is a second length, and the length of the second feature field is a second length.

11. The method according to claim 7, wherein in the case that a function of the first feature field is a rank indication, the function of the second feature field is a Modulation and Coding Scheme (MCS) indication.

12. The method according to claim 11, wherein in the case that the rank indication of the first feature field is smaller than or equal to a pre-defined threshold, the second feature field is an MCS field, and a length of the MCS field is m bits;

in the case that the rank indication of the first feature field is greater than the pre-defined threshold, the second feature field comprises two MCS fields, a length of each MCS field is m bits, and the length of the second feature field is 2m bits, wherein m is a positive integer.

13. The method according to claim 7, wherein a bit number of the first feature field is 1;

in the case that the first feature field is 0, the function of the second feature field is a bitmap resource allocation mode;

in the case that the first feature field is 1, the function of the second feature field is a continuous resource allocation mode.

14. A base station, comprising a memory, a processor and a computer program stored in the memory and operable on the processor, wherein the processor is used to execute the computer program to perform the method of transmitting control information according to claim 1.

15. A terminal, comprising a memory, a processor and a computer program stored in the memory and operable on the processor, wherein the processor is used to execute the computer program to perform the method of receiving control information according to claim 7.

* * * * *